US012565225B2

(12) United States Patent
Marsolek et al.

(10) Patent No.: US 12,565,225 B2
(45) Date of Patent: Mar. 3, 2026

(54) WORK MACHINE CONTROL BASED ON BIOMETRICS

(71) Applicant: Caterpillar Paving Products Inc., Brooklyn Park, MN (US)

(72) Inventors: John Lee Marsolek, Watertown, MN (US); Elizabeth R. K. Brockman, Charlotte, NC (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 240 days.

(21) Appl. No.: 18/357,674

(22) Filed: Jul. 24, 2023

(65) Prior Publication Data

US 2025/0033656 A1     Jan. 30, 2025

(51) Int. Cl.
*B60W 50/12* (2012.01)
*B60W 40/08* (2012.01)

(52) U.S. Cl.
CPC ............ *B60W 50/12* (2013.01); *B60W 40/08* (2013.01); *B60W 2040/0872* (2013.01); *B60W 2300/17* (2013.01)

(58) Field of Classification Search
None
See application file for complete search history.

(56) References Cited

U.S. PATENT DOCUMENTS

| | | | |
|---|---|---|---|
| 5,574,641 A | 11/1996 | Kawakami et al. | |
| 5,783,997 A | 7/1998 | Saitoh et al. | |
| 5,793,292 A * | 8/1998 | Ivey, Jr. ................. | G08B 21/06 |
| | | | 340/576 |
| 6,104,296 A * | 8/2000 | Yasushi ................. | A61B 5/282 |
| | | | 701/1 |
| 6,239,707 B1 * | 5/2001 | Park ....................... | G08B 21/06 |
| | | | 340/576 |
| 6,293,361 B1 | 9/2001 | Mueller | |
| 6,485,418 B2 | 11/2002 | Yasushi et al. | |
| 7,134,997 B2 | 11/2006 | Yanagidaira et al. | |
| 8,171,820 B2 * | 5/2012 | Song ..................... | B62D 1/046 |
| | | | 340/576 |
| 8,684,938 B2 * | 4/2014 | Sakai ................. | A61B 5/02455 |
| | | | 600/509 |
| 8,847,769 B2 | 9/2014 | Ershov et al. | |
| 8,870,782 B2 * | 10/2014 | Futatsuyama ...... | A61B 5/02125 |
| | | | 600/500 |
| 9,527,508 B1 * | 12/2016 | Lee ........................ | A61B 5/742 |
| 9,775,565 B1 * | 10/2017 | Berg-Neuman ...... | B60W 40/08 |

(Continued)

FOREIGN PATENT DOCUMENTS

| | | |
|---|---|---|
| CN | 106073712 B | 8/2019 |
| CN | 213189518 U | 5/2021 |

(Continued)

*Primary Examiner* — Jonathan M Dager

(57) ABSTRACT

A controller may obtain, from one or more sensors of an operator control of a work machine, sensor data collected from at least one hand of an operator using the operator control. The controller may determine, based on the sensor data, at least one of a physiological profile of the operator or an amount of time that the operator releases the operator control. The controller may cause, based on the at least one of the physiological profile of the operator or the amount of time that the operator releases the operator control, a limitation on a capability of a work implement of the work machine.

20 Claims, 3 Drawing Sheets

(56)                References Cited

U.S. PATENT DOCUMENTS

| | | | | |
|---|---|---|---|---|
| 9,908,530 | B1 * | 3/2018 | Fields | G08B 21/02 |
| 10,152,871 | B2 * | 12/2018 | Vandommele | G08B 21/06 |
| 10,850,614 | B2 * | 12/2020 | Albakri | A61B 5/4845 |
| 10,921,139 | B2 * | 2/2021 | Edwards | G01C 21/20 |
| 11,627,918 | B2 * | 4/2023 | Nakamura | A61B 5/165 |
| | | | | 600/500 |
| 11,775,909 | B2 * | 10/2023 | Reaume | G06N 20/00 |
| | | | | 705/7.38 |
| 11,780,483 | B2 * | 10/2023 | Subrahmaniyan | B61L 25/021 |
| | | | | 701/19 |
| 11,806,157 | B2 * | 11/2023 | Kang | A61B 5/4094 |
| 11,810,373 | B2 * | 11/2023 | Takamoto | G08B 21/02 |
| 2006/0285725 | A1 * | 12/2006 | Recce | E05F 15/695 |
| | | | | 340/5.52 |
| 2007/0265540 | A1 * | 11/2007 | Fuwamoto | A61B 5/35 |
| | | | | 600/515 |
| 2010/0137702 | A1 * | 6/2010 | Park | A61B 5/318 |
| | | | | 600/509 |
| 2011/0234373 | A1 * | 9/2011 | McBain | B64D 45/0034 |
| | | | | 340/5.82 |
| 2012/0101690 | A1 * | 4/2012 | Srinivasan | A61B 5/6887 |
| | | | | 600/509 |
| 2012/0112879 | A1 * | 5/2012 | Ekchian | A61B 5/14546 |
| | | | | 340/5.53 |
| 2012/0212353 | A1 * | 8/2012 | Fung | G08G 1/167 |
| | | | | 701/1 |
| 2015/0258995 | A1 * | 9/2015 | Essers | B60W 40/08 |
| | | | | 340/576 |
| 2015/0379457 | A1 * | 12/2015 | Jackson | G06Q 10/06398 |
| | | | | 705/7.17 |
| 2016/0090084 | A1 * | 3/2016 | Takamatsu | B60W 30/10 |
| | | | | 701/1 |
| 2016/0272214 | A1 * | 9/2016 | Chen | B60R 25/10 |
| 2017/0158303 | A1 * | 6/2017 | Michaelis | G06V 10/75 |
| 2017/0355377 | A1 * | 12/2017 | Vijaya Kumar | B60W 50/0098 |
| 2019/0092337 | A1 * | 3/2019 | Chua | B60W 30/14 |
| 2019/0331761 | A1 * | 10/2019 | Wynn | G01S 11/12 |
| 2020/0062266 | A1 * | 2/2020 | Sakaguchi | B60W 40/08 |
| 2020/0392696 | A1 * | 12/2020 | Zuo | E02F 9/2041 |
| 2021/0347367 | A1 * | 11/2021 | Bielby | B60W 40/08 |
| 2022/0025611 | A1 * | 1/2022 | Kandula | G06F 3/016 |
| 2022/0318705 | A1 * | 10/2022 | Reaume | G06N 20/00 |
| 2022/0389686 | A1 * | 12/2022 | Holter | G05D 1/81 |

FOREIGN PATENT DOCUMENTS

| | | |
|---|---|---|
| DE | 102004048566 A1 | 4/2006 |
| DE | 102005007963 A1 | 8/2006 |
| DE | 102006005664 A1 | 8/2007 |
| DE | 102006023287 B4 | 1/2017 |
| DE | 102004022581 B4 | 8/2017 |
| EP | 3998386 A1 | 5/2022 |
| GB | 2375645 A | 11/2002 |
| WO | 2009043650 A1 | 4/2009 |
| WO | 2018152712 A1 | 8/2018 |
| WO | 2019027389 A3 | 2/2019 |

* cited by examiner

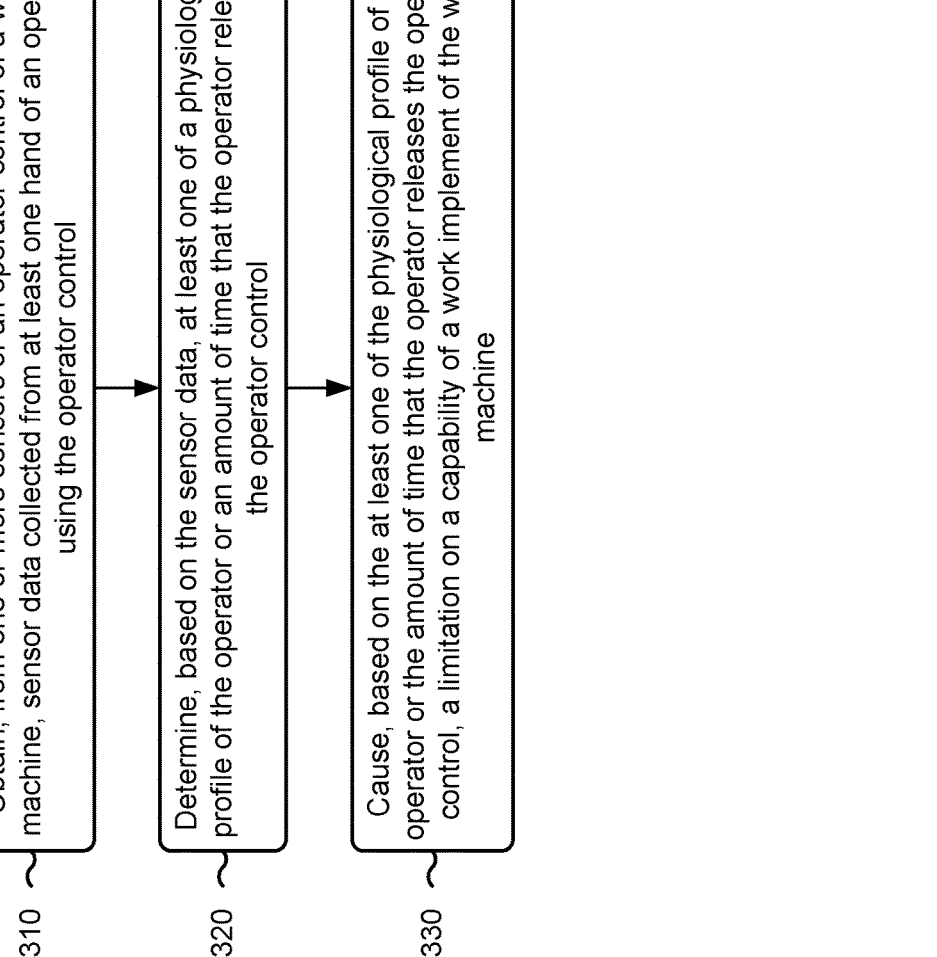

310 — Obtain, from one or more sensors of an operator control of a work machine, sensor data collected from at least one hand of an operator using the operator control 320 — Determine, based on the sensor data, at least one of a physiological profile of the operator or an amount of time that the operator releases the operator control 330 — Cause, based on the at least one of the physiological profile of the operator or the amount of time that the operator releases the operator control, a limitation on a capability of a work implement of the work machine

WORK MACHINE CONTROL BASED ON BIOMETRICS

TECHNICAL FIELD

The present disclosure relates generally to work machines and, for example, to work machine control based on biometrics.

BACKGROUND

A work machine, such as a motor grader, a backhoe loader, an agricultural tractor, a wheel loader, a skid-steer loader, and/or other heavy equipment, is used for a variety of tasks requiring operator control of the work machine and various work implements associated with the work machine. The work machine and the work implements can be complicated and difficult to operate. Thus, any deterioration to the skill or ability of an operator of the work machine may have a significant impact on the operation of the work machine. In some cases, the operator's performance may fluctuate based on a physiological state of the operator (e.g., a pulse rate of the operator, a blood oxygen level of the operator, or the like). Accordingly, worsening of the operator's physiological state may result in the work machine being operated ineffectively and/or inefficiently. This may result in tasks being performed slowly and/or at a low quality level, thereby requiring additional time to complete tasks, correction of completed tasks, and/or duplication of tasks.

U.S. Pat. No. 9,775,565 (the '565 patent) discloses a system that monitors ethanol alcohol levels of a vehicle operator by collecting sweat from the operator's hands, and detecting the presence, if any, of ethanol in the sweat. The '565 patent states that if the measurable ethanol in collected moisture from the operator's hands exceeds a preset threshold, the system could be configured to warn the operator to park the vehicle and thereafter to disable operation of the vehicle. Furthermore, the '565 patent discloses a system that monitors for pulse rate and oxygen levels of the operator. The '565 patent states that when the pulse rate and/or oxygen levels are outside of the normal parameters for an operator, the system will warn the operator to park the vehicle and thereafter disable operation of the immobile vehicle.

The '565 patent does not describe integrating a monitoring system into the controls of a work machine (e.g., a joystick). For example, an operator of a work machine may handle and interact with controls of a work machine differently than an operator of a vehicle would handle and interact with a steering wheel of the vehicle. Moreover, the '565 patent does not describe limiting the capabilities of a work implement of a work machine (e.g., a blade, a bucket, or the like). For example, the work machine may be capable of travel, similar to a vehicle, but also capable of operating the implement. Accordingly, when disabling a work machine, there may be considerations relating to preventing damage to work being performed at a worksite that are not applicable to a vehicle.

The control system of the present disclosure solves one or more of the problems set forth above and/or other problems in the art.

SUMMARY

A work machine may include a work implement, an operator control including one or more biometric sensors positioned to be contacted by at least one hand of an operator using the operator control, and a controller. The controller may be configured to obtain, from the one or more biometric sensors, biometric sensor data collected from the at least one hand of the operator. The controller may be configured to determine, based on the biometric sensor data, a physiological profile of the operator. The controller may be configured to cause, based on the physiological profile of the operator, a limitation on a capability of the work implement.

A control system for a work machine may include one or more sensors, for an operator control of the work machine, configured to collect sensor data relating to an operator using the operator control. The control system may include a controller configured to obtain, from the one or more sensors, sensor data collected from at least one hand of the operator using the operator control. The controller may be configured to cause, based on the sensor data, a limitation on a capability of a work implement of the work machine.

A method may include obtaining, by a controller and from one or more sensors of an operator control of a work machine, sensor data collected from at least one hand of an operator using the operator control. The method may include determining, by the controller and based on the sensor data, at least one of a physiological profile of the operator or an amount of time that the operator releases the operator control. The method may include causing, by the controller and based on the at least one of the physiological profile of the operator or the amount of time that the operator releases the operator control, a limitation on a capability of a work implement of the work machine.

BRIEF DESCRIPTION OF THE DRAWINGS

FIG. 3 is a flowchart of an example process associated with control of an implement of a machine based on operator impairment.

DETAILED DESCRIPTION

This disclosure relates to a control system, which is applicable to any machine that is mobile and/or that utilizes a work implement. For example, the machine may be a compactor machine, a paving machine, a cold planer, a grading machine, a backhoe loader, a wheel loader, a harvester, an excavator, a motor grader, a skid steer loader, a tractor, a dozer, or the like.

Figure 1:
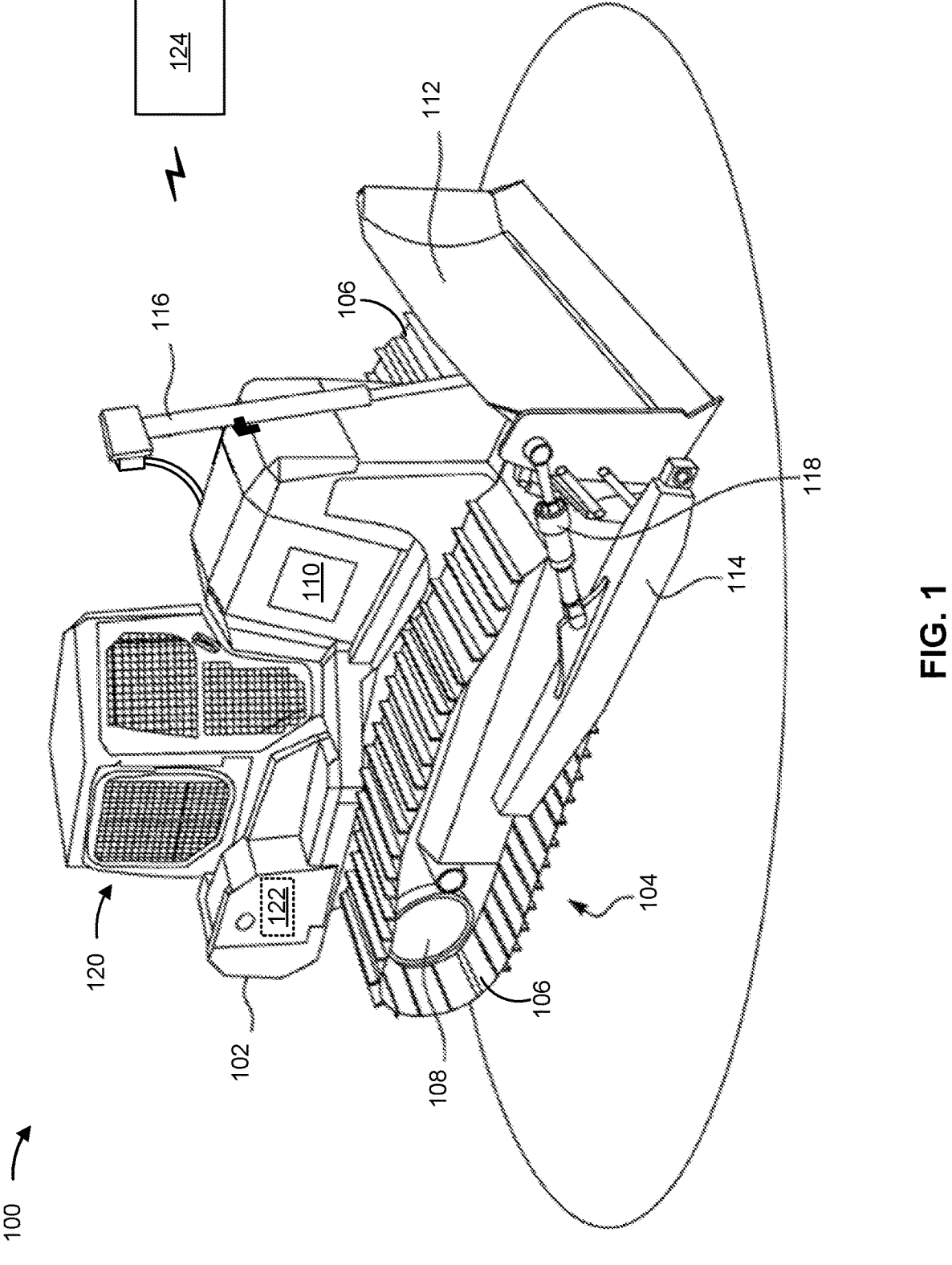
FIG. 1 is a perspective view of an example machine.

FIG. 1 is a perspective view of an example machine 100. The machine 100 may perform earth moving, excavation, or another operation associated with an industry such as construction or mining, among other examples. That is, the machine 100 is a work machine. For example, as illustrated in FIG. 1, the machine 100 is a dozer. However, the machine 100 may be another type of machine, as described above.

The machine 100 includes a frame 102 that is supported by an undercarriage 104 used to propel the machine 100 in a forward direction and/or a rearward direction. In other words, the machine 100 is a mobile machine. The undercarriage 104 is configured to engage a ground surface, such as a road or another type of terrain. As shown, the undercarriage 104 includes a pair of endless tracks 106 driven by respective drive wheels 108. Although the machine 100 is illustrated as having tracks 106, the undercarriage 104 may additionally, or alternatively, include one or more wheels for propelling the machine 100.

The frame 102 supports a prime mover 110. The prime mover 110 may include an engine (e.g., an internal combustion engine), such as a diesel engine, a gasoline engine, or a gaseous fuel engine, among other examples. Additionally, or alternatively, the prime mover 110 may include an electric motor (e.g., for electric powering of machine 100 or hybrid powering of machine 100 with the engine). The prime mover 110 is configured to provide power to drive the tracks 106. Furthermore, the prime mover 110 is configured to provide power to an implement 112 (e.g., by driving one or more hydraulic pumps that provide pressurized fluid to one or more actuators of machine 100).

In FIG. 1, the implement 112 (e.g., a work implement) is illustrated as a blade. However, the implement 112 may be, for example, a bucket, a scoop, a moldboard, a compaction drum, a milling drum, a hook, and/or a ripper, among other examples. The implement 112 is movable with respect to the frame 102. For example, the implement 112 may be pivotally connected to the frame 102 by arms 114 on each side of the machine 100. One or more first hydraulic cylinders 116 may be coupled to the frame 102 to support the implement 112 in the vertical direction and allow the implement 112 to move up or down vertically. Additionally, one or more second hydraulic cylinders 118 may be included on each side of the machine 100 to allow a pitch or an angle (e.g., an angle of attack) of the implement 112 to change. The first and second hydraulic cylinders 116, 118 may be actuators that receive actuation instructions to adjust, lift, lower, or otherwise move and/or position the implement 112. In some examples, the implement 112 may be connected to the frame 102 by a boom assembly (e.g., including a boom member and a stick member) configured to be articulated relative to the frame 102 by one or more hydraulic cylinders.

An operator station 120 may be supported on the frame 102. The operator station 120 may include one or more displays and/or one or more operator controls to operate and/or drive the machine 100. For example, the operator controls may include a joystick, a lever, and/or a knob, among other examples. The machine 100 includes a controller 122 for electrically controlling various aspects of the machine 100. For example, the controller 122 may send and receive signals from various components of the machine 100 during the operation of the machine 100.

In some implementations, the machine 100 may be remotely controllable by an operator located off board the machine 100 via a remote control device 124. The remote control device 124 may include one or more input devices configured to control propulsion of the machine 100, steering of the machine 100, and/or actuation (e.g., movement) of the implement 112. For example, the input devices may include one or more joysticks, one or more control sticks, and/or one or more touchpads. Based on inputs provided via the input devices, the remote control device 124 may transmit (e.g., wirelessly, as radio signals) commands to the controller 122. The controller 122 may interpret the commands and cause the machine 100 to operate in accordance with the commands.

As indicated above, FIG. 1 is provided as an example. Other examples may differ from what is described with regard to FIG. 1.

Figure 2:
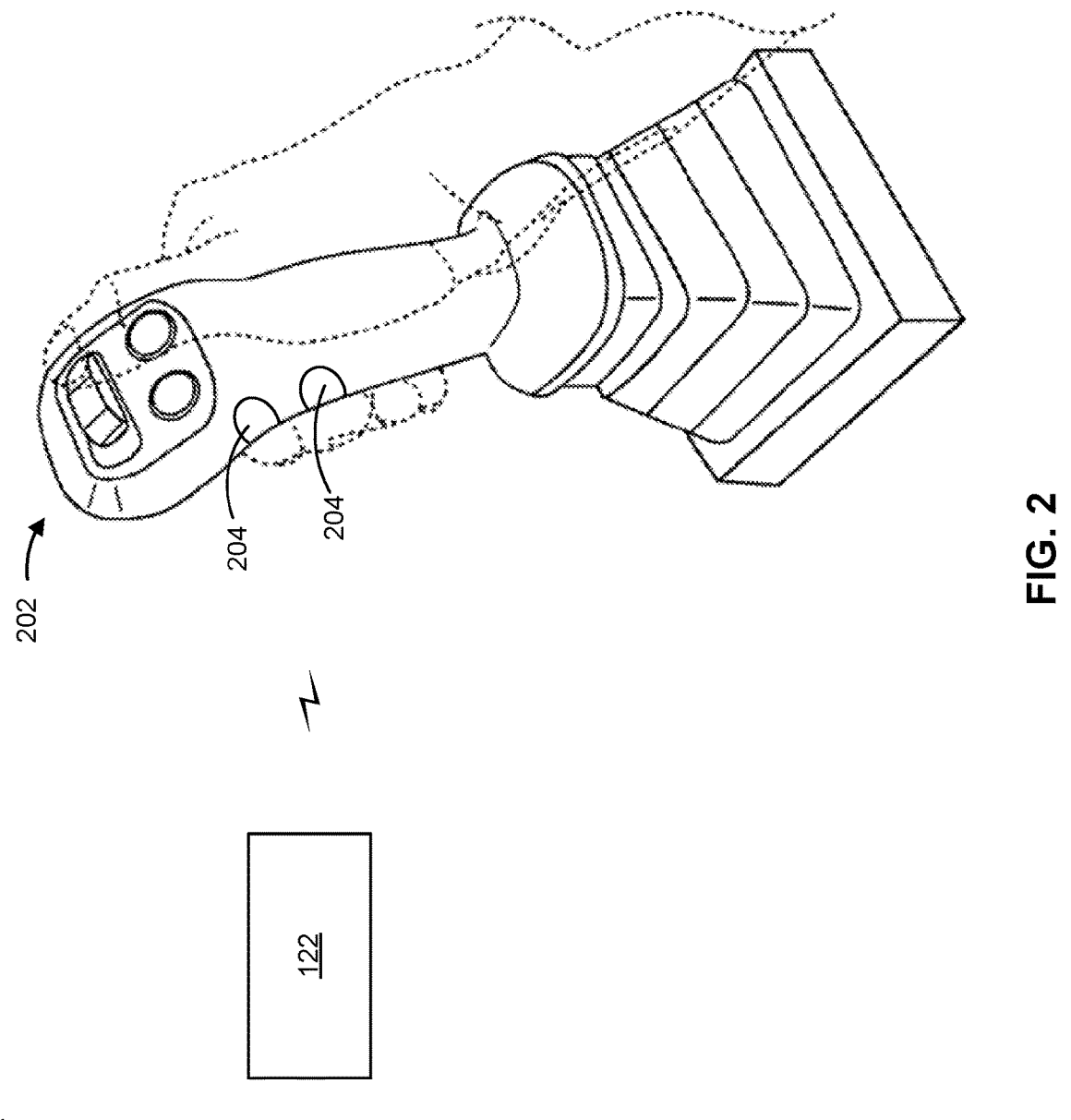
FIG. 2 is a diagram of an example control system.

FIG. 2 is a diagram of an example control system 200. The control system 200 may provide control of a propulsion system, a steering system, and/or an implement system of the machine 100. The control system 200 includes the controller 122 and an operator control 202 (e.g., of the operator station 120).

The controller 122 may include one or more memories and one or more processors communicatively coupled to the one or more memories. A processor may include a central processing unit, a graphics processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. The processor may be capable of being programmed to perform one or more operations or processes described elsewhere herein. A memory may include volatile and/or nonvolatile memory. For example, the memory may include random access memory (RAM), read only memory (ROM), a hard disk drive, and/or another type of memory (e.g., a flash memory, a magnetic memory, and/or an optical memory). The memory may be a non-transitory computer-readable medium. The memory may store information, one or more instructions, and/or software (e.g., one or more software applications) related to the operation of the controller 122. The controller 122 may be configured to perform one or more operations described herein.

The operator control 202 is a device that is manually handled by an operator of the machine 100. The operator control 202 may be a joystick, as shown in FIG. 2. Alternatively, the operator control 202 may be a steering wheel, a lever, or another type of device that is controllable by at least one hand of the operator. In some implementations, the operator control 202 is the remote control device 124. The operator control 202 may be configured to control propulsion of the machine 100, steering of the machine 100, and/or the implement 112.

The operator control 202 includes one or more sensors 204 (e.g., multiple sensors 204) positioned to be contacted by at least one hand of an operator using the operator control 202. For example, the one or more sensors 204 may be embedded in the operator control 202 or attached to a surface of the operator control 202. As an example, the sensors 204 may include one or more first sensors 204 positioned to be contacted by a first finger of the operator and one or more second sensors 204 positioned to be contacted by a second finger of the operator. A sensor 204 may include a biometric sensor (e.g., a sensor that collects data relating to a biometric associated with a person). A sensor 204 may include a heart rate monitor, a pulse sensor, a blood oxygen sensor, a pulse oximeter, a respiration rate sensor, a blood alcohol sensor, and/or a touch sensor (e.g., a touch switch, a piezoelectric sensor, or the like), among other examples.

The sensors 204 may be configured to collect sensor data relating to an operator when the operator is using the operator control 202. For example, the sensors 204 may collect the sensor data in an ongoing manner as the operator is using the operator control 202. One or more sensors 204 may collect biometric sensor data relating to a heart rate of the operator, a blood oxygen level of the operator, a respiration rate of the operator, and/or a blood alcohol content of the operator, among other examples. Additionally, or alternatively, one or more sensors 204 (e.g., one or more touch sensors) may collect sensor data relating to whether the operator (e.g., a hand of the operator) is in contact with the operator control 202.

The controller 122 may obtain, from the sensor(s) 204, sensor data (e.g., biometric sensor data) collected from at least one hand of the operator (e.g., while the operator is using the operator control 202). For example, the controller 122 may periodically (e.g., every 10 seconds, every 1 second, every 0.5 seconds, or the like) obtain sensor data from the sensor(s) 204. As described above, the sensor data may relate to a heart rate of the operator, a blood oxygen level of the operator, a respiration rate of the operator, a blood alcohol content of the operator, and/or whether the operator (e.g., a hand of the operator) is contacting the operator control 202.

In some implementations, to obtain the sensor data, the controller 122 may obtain first sensor data from the first sensor(s) 204 positioned to contact the first finger of the operator and second sensor data from the second sensor(s) 204 positioned to contact the second finger of the operator. The first sensor data and the second sensor data may be collected by the first sensor(s) 204 and the second sensor(s) 204, respectively, concurrently or sequentially (e.g., in quick succession). The first sensor data and the second sensor data may be different (e.g., even though the first sensor data and the second sensor data were collected at or around the same time) due to noise (e.g., caused by machine vibration), due to the operator using an improper hand position, and/or due to foreign substances (e.g., sweat, grease, dirt, or the like) affecting the measurements of the first sensor(s) 204 and/or the second sensor(s) 204.

The controller 122 may determine sensor data that is to be used by the controller 122 based on the first sensor data and the second sensor data. For example, the controller 122 may discard one of the first sensor data or the second sensor data, and the controller 122 may use the non-discarded one as the sensor data. The controller 122 may discard the first sensor data or the second sensor data if the first sensor data or the second sensor data has an amount of deviation from reference data (e.g., previous sensor data or default data) that meets or exceeds a threshold. As another example, the controller 122 compute an average of the first sensor data and the second sensor data, and the controller 122 may use the average as the sensor data. As another example, the controller 122 may perform a data fusion, or sensor fusion, technique on the first sensor data and the second sensor data, and the controller 122 may use the fused data as the sensor data.

Sensor data relating to biometrics of the operator is collected, processed, and/or stored by the machine 100 in compliance with applicable laws and regulations. The controller 122 may determine, based on the sensor data, a physiological profile of the operator. For example, as sensor data is obtained by the controller 122, the controller 122 may determine (e.g., update) the physiological profile of the operator (e.g., in real time).

In some examples, the physiological profile of the operator may indicate a set of biometrics for the operator (e.g., a heart rate, a blood oxygen level, and/or a blood alcohol content, among other examples). For example, the controller 122 may determine one or more biometrics for the operator based on the sensor data. In some examples, the physiological profile of the operator may indicate a classification of the operator (e.g., no impairment, low impairment, moderate impairment, severe impairment, or the like) based on a set of biometrics for the operator. The controller 122 may determine the classification of the operator using a machine learning model trained (e.g., based on historical biometric information associated with one or more operators) to output a classification of an operator based on an input of a set of biometrics for the operator. Additionally, or alternatively, the controller 122 may determine the classification of the operator by comparing the biometrics to thresholds or reference biometrics (e.g., associated with an unimpaired physiological state), and computing the classification based on amounts that the biometrics deviate from the reference biometrics. In some examples, the physiological profile may indicate a set of biometrics for the operator and associated classifications for the biometrics (e.g., "heart rate: high; blood oxygen level: very low"). The controller 122 may determine classifications for biometrics (e.g., very low, low, normal, high, very high, or the like) by comparing the biometrics with thresholds or reference biometrics.

In some implementations, the controller 122 may detect whether the operator's hands are off of the operator control 202. For example, the controller 122 may detect an amount of time that the operator releases the operator control 202 based on sensor data collected by the sensor(s) 204 (e.g., touch sensor(s)).

The controller 122 may cause one or more capabilities of the machine 100 to be limited based on the sensor data. Specifically, the controller 122 may cause one or more capabilities of the machine 100 to be limited based on the physiological profile of the operator and/or based on whether the operator has released the operator control 202. As an example, the controller 122 may cause, based on the physiological profile of the operator, a limitation on a capability of the implement 112 and/or a limitation on a propulsion capability of the machine 100 (e.g., a capability of the machine 100 to travel forwards or backwards). Additionally, or alternatively, the controller 122 may cause the limitation on the capability of the implement 112 and/or the limitation on the propulsion capability of the machine 100 based on the sensor data indicating that the operator has released the operator control 202 for an amount of time (e.g., continuously or cumulatively) satisfying a threshold (e.g., 20 seconds, 30 seconds, or the like).

The limitation on the capability of the implement 112 may be a restriction to a movement of the implement 112 (e.g., a derating of the implement 112, such as by placing an upper bound and/or a lower bound on an angular position of the implement 112, an angle of attack of the implement 112, a raising or a lowering of the implement 112, a sideshift of the implement 112, a rotation of the implement 112, a vibration of the implement 112, or the like) or may be disablement of the implement 112. To cause the limitation on the capability of the implement 112, the controller 122 may block (e.g., reject or ignore) operator commands to move the implement 112 in violation of the restriction, the controller 122 may remove or decrease power to the implement 112, the controller 122 may limit an output of a pump that controls one or more hydraulic actuators for the implement 112, or the like. The limitation on the propulsion capability of the machine 100 may be a restriction to the propulsion capability (e.g., a derating of the propulsion capability, such as by placing a speed limit on the propulsion capability) or may be disablement of the propulsion capability (e.g., disabling forward and/or reverse propulsion of the machine 100, forcing the machine 100 into a park gear, or the like). To cause the limitation on the propulsion capability of the machine 100, the controller 122 may block (e.g., reject or ignore) operator commands to propel the machine 100 in violation of the restriction, the controller 122 may cause deration of the prime mover 110 of the machine 100, the controller 122 may cause engagement of a brake of the machine 100, the controller 122 may cause engagement of a park gear of the machine 100, or the like.

In some examples, the controller 122 may cause the limitation on the capability of the implement 112 (e.g., restricting movement of the implement 112 or disabling the implement 112) responsive to the physiological profile indicating a first physiological state of the operator (e.g., moderate impairment of the operator). Furthermore, the controller 122 may cause an additional limitation on the propulsion capability of the machine 100 responsive to the physiological profile indicating a second (e.g., worse) physiological state of the operator (e.g., severe impairment of the operator). In other words, if the operator is exhibiting a level of impairment, then the controller 122 may first limit the capability of the implement 112, and if the operator's level of impairment worsens, then the controller 122 may then also limit the propulsion capability of the machine 100 (e.g., because operation of the implement 112 may require greater dexterity than controlling the propulsion of the machine 100). In this way, at an initial level of impairment, damage due to poor operation of the implement 112 may be mitigated, but the machine 100 is still operable to allow the machine 100 to be returned to a holding area to mitigate damage that may be caused by the mere presence of the machine 100 at a work area (e.g., due to a weight of the machine 100, due to the machine 100 obstructing other machines, or the like). However, at a higher level of impairment, the propulsion capability of the machine 100 may also be limited to mitigate damage that erratic or haphazard driving of the machine 100 may cause. In some examples, the propulsion capability may first be limited, and the implement 112 may be limited second.

In some examples, the controller 122, to cause the limitation on the capability of the implement 112 and/or the limitation on the propulsion capability of the machine 100, may adjust the limitation as the physiological profile of the operator changes over time. For example, the controller 122 may cause relaxing of the limitation based on improvements to the physiological profile (e.g., a lessening deviation of the physiological profile from a reference physiological profile), and the controller 122 may cause further restriction of the limitation based on deterioration of the physiological profile (e.g., an increasing deviation of the physiological profile from a reference physiological profile). In some examples, the controller 122, to cause the limitation on the capability of the implement 112 and/or the limitation on the propulsion capability of the machine 100, may cause the capability of the implement 112 and/or the propulsion capability of the machine 100 to be gradually limited. For example, gradually limiting the capability of the implement 112 and/or the propulsion capability of the machine 100 may include increasing (e.g., continuously or in steps) a level of restriction of the implement 112 and/or the propulsion up to fully disabling the implement 112 and/or the propulsion. The controller 122 may gradually limit the capability of the implement 112 and/or the propulsion capability of the machine 100 as the physiological profile of the operator changes. For example, the controller 122 may gradually limit the capability of the implement 112 and/or the propulsion capability of the machine 100 in correlation with the physiological profile increasingly deviating from a reference physiological profile and/or with a classification of the operator increasingly being downgraded.

The controller 122 may transmit, to a device remote from the machine 100 (e.g., a back office device, a device associated with a worksite supervisor, a device associated with an owner of the machine 100, an external controller, or an external display), a request for a new operator for the machine 100. Additionally, or alternatively, the controller 122 may transmit, to the device remote from the machine 100, an alert indicating a recommendation for monitoring the work machine or intervention with the work machine. For example, the controller 122 may transmit the request and/or the alert responsive to causing the limitation on the capability of the implement 112 and/or the limitation on the propulsion capability of the machine 100. As another example, the controller 122 may transmit the request and/or the alert responsive to the physiological profile of the operator indicating impairment of the operator. In some examples, the controller 122 may transmit, to the device, an indication that the operator is impaired, responsive to the physiological profile of the operator indicating impairment of the operator. The indication may enable a supervisor of the operator to take appropriate action with respect to the impairment of the operator (e.g., shutting down the machine 100, replacing the operator with a new operator, or the like).

The controller 122 may receive an input indicating that the machine 100 is to return to normal operation (e.g., to operation without limitation on the capability of the implement 112 and/or limitation on the propulsion capability of the machine 100). For example, the input may be provided via a console of the machine 100 or via a device remotely located from the machine 100 (e.g., a back office device, a device associated with a worksite supervisor, or a device associated with an owner of the machine 100). The input may be provided by a supervisor of a worksite for the machine 100, an owner of the machine 100, the new operator of the machine 100, or the like (e.g., that possess a password, a key, or the like, that enables the input to be provided).

As indicated above, FIG. 2 is provided as an example. Other examples may differ from what is described with regard to FIG. 2.

FIG. 3 is a flowchart of an example process 300 associated with control of an implement of a machine based on operator impairment. One or more process blocks of FIG. 3 may be performed by a controller (e.g., controller 122). Additionally, or alternatively, one or more process blocks of FIG. 3 may be performed by another device or a group of devices separate from or including the controller, such as another device or component that is internal or external to the machine 100.

As shown in FIG. 3, process 300 may include obtaining, from one or more sensors of an operator control of a work machine, sensor data collected from at least one hand of an operator using the operator control (block 310). For example, the controller may obtain, from one or more sensors of an operator control of a work machine, sensor data collected from at least one hand of an operator using the operator control, as described above. The one or more sensors may include one or more of a pulse sensor, a blood oxygen sensor, or a blood alcohol sensor. The operator control may be a joystick or a remote control device for the work machine.

The one or more sensors may include one or more first sensors positioned to be contacted by a first finger of the operator and one or more second sensors positioned to be contacted by a second finger of the operator. Obtaining the sensor data may include obtaining first sensor data from the one or more first sensors and second biometric sensor data from the one or more second sensors, and determining the sensor data based on the first sensor data and the second sensor data.

As further shown in FIG. 3, process 300 may include determining, based on the sensor data, at least one of a physiological profile of the operator or an amount of time that the operator releases the operator control (block 320). For example, the controller may determine, based on the sensor data, at least one of a physiological profile of the operator or an amount of time that the operator releases the operator control, as described above. As an example, the one or more sensors may be touch sensors, and determining the amount of time that the operator releases the operator control may include detecting, based on the sensor data from the one or more touch sensors, an amount of time that the operator releases the operator control.

As further shown in FIG. 3, process 300 may include causing, based on the at least one of the physiological profile of the operator or the amount of time that the operator releases the operator control, a limitation on a capability of a work implement of the work machine (block 330). For example, the controller may cause, based on the at least one of the physiological profile of the operator or the amount of time that the operator releases the operator control, a limitation on a capability of a work implement of the work machine, as described above. The work implement may be a compaction drum, a boom assembly, a milling drum, or a blade. The limitation on the capability of the work implement may be disablement of the work implement. Alternatively, the limitation on the capability of the work implement may be a restriction to a movement of the work implement.

Causing the limitation on the capability of the work implement may include causing the capability of the work implement to be gradually limited as the physiological profile of the operator changes. The physiological profile of the operator and the amount of time that the operator releases the operator control may be determined, and the limitation on the capability of the work implement may be caused based on the physiological profile of the operator and the amount of time that the operator releases the operator control.

Causing the limitation on the capability of the work implement may include causing the limitation on the capability of the work implement responsive to the sensor data indicating a first physiological state of the operator, and process 300 may include causing an additional limitation on a propulsion capability of the work machine responsive to the sensor data indicating a second physiological state of the operator. In some examples, process 300 may include transmitting, to a device, a request for a new operator for the work machine responsive to causing the limitation on the capability of the work implement.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The control system described herein may be used with any work machine that is mobile and/or that utilizes a work implement. For example, the control system may be used with a work machine that can be controlled by an operator using an operator control, such as a joystick or a remote control device. The work machine and the work implement can be complicated and difficult for the operator to control via the operator control. Thus, any deterioration to the operator's skill or ability may have a significant impact on the operation of the work machine. In some cases, the operator's performance may fluctuate based on a physiological state of the operator (e.g., a pulse rate of the operator, a blood oxygen level of the operator, or the like). Accordingly, worsening of the operator's physiological state may result in the work machine being operated ineffectively and/or inefficiently. This may result in tasks being performed slowly and/or at a low quality level, thereby requiring additional time to complete tasks, correction of completed tasks, and/or duplication of tasks, which uses excessive machine hours, increases machine wear, and/or increases fuel consumption.

The control system described herein is useful for reducing or preventing ineffective and/or inefficient operation of a work machine caused by a worsening of an operator's physiological state. In particular, the control system may utilize sensors in an operator control to detect biometrics associated with an operator, such as heart rate, blood oxygen level, and/or blood alcohol content, among other examples. In some examples, the control system may utilize multiple sensors that are positioned in the operator control to detect biometrics from different fingers of the operator, thereby improving a quality of the sensor data that is collected (e.g., using sensor fusion). Based on the detected biometrics, the control system may limit the capabilities of the work implement and/or a propulsion capability of the work machine as needed. In this way, the control system may improve an efficiency and a quality at which tasks are performed using the work machine. Accordingly, the control system may improve the speed at which tasks are performed using the work machine and/or reduce the need for the work machine (or another machine) to perform corrective or repetitive tasks, thereby conserving machine hours, reducing machine wear, and/or conserving fuel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A work machine, comprising:
   a work implement;
   a joystick comprising a plurality of biometric sensors positioned to be contacted by a particular hand of an operator using the joystick, wherein the plurality of biometric sensors include a first biometric sensor positioned to be contacted by a first finger of the operator and a second biometric sensor positioned to be contacted by a second finger of the operator; and
   a controller configured to:
      obtain, from the plurality of biometric sensors, biometric sensor data collected from the particular hand of the operator;

determine, based on the biometric sensor data, a physiological profile of the operator; and cause, based on the physiological profile of the operator, a limitation on a capability of the work implement.

2. The work machine of claim 1, wherein the limitation on the capability of the work implement is disablement of the work implement.

3. The work machine of claim 1, wherein the limitation on the capability of the work implement is a restriction to a movement of the work implement.

4. The work machine of claim 1, wherein the controller, to obtain the biometric sensor data, is configured to:

obtain first biometric sensor data from the first biometric sensor and second biometric sensor data from the second biometric sensor; and determine the biometric sensor data based on the first biometric sensor data and the second biometric sensor data.

5. The work machine of claim 1, wherein the controller, to cause the limitation on the capability of the work implement, is configured to:

cause the limitation on the capability of the work implement responsive to the biometric sensor data indicating a first physiological state of the operator, and wherein the controller is further configured to:

cause an additional limitation on a propulsion capability of the work machine responsive to the biometric sensor data indicating a second physiological state of the operator.

6. The work machine of claim 1, wherein the plurality of biometric sensors comprise one or more of a pulse sensor, a blood oxygen sensor, or a blood alcohol sensor.

7. The work machine of claim 1, wherein the work implement is a compaction drum, a boom assembly, a milling drum, or a blade.

8. A control system for a work machine, comprising:

a plurality of biometric sensors, for a joystick of the work machine, positioned to be contacted by a particular hand of an operator of the joystick, wherein the plurality of biometric sensors include a first biometric sensor positioned to be contacted by a first finger of the operator and a second biometric sensor positioned to be contacted by a second finger of the operator; and a controller configured to:

obtain, from the plurality of biometric sensors, sensor data collected from the particular hand of the operator; and cause, based on the sensor data, a limitation on a capability of a work implement of the work machine.

9. The control system of claim 8, wherein the controller, to cause the limitation of the capability of the work implement, is configured to:

cause, based on a physiological profile of the operator that is based on the sensor data, the limitation on the capability of the work implement.

10. The control system of claim 8, wherein the plurality of biometric sensors comprise one or more touch sensors, and wherein the controller is further configured to:

detect, based on the sensor data from the one or more touch sensors, an amount of time that the operator releases the joystick.

11. The control system of claim 8, wherein the controller, to cause the limitation on the capability of the work implement, is configured to:

cause, based on the sensor data indicating that the operator has released the joystick for an amount of time satisfying a threshold, the limitation on the capability of the work implement.

12. The control system of claim 8, wherein the controller is further configured to:

transmit, to a device remote from the work machine, an alert indicating a recommendation for monitoring the work machine or intervention with the work machine responsive to causing the limitation on the capability of the work implement.

13. The control system of claim 8, wherein the controller is further configured to:

transmit, to a device remote from the work machine, a request for a new operator for the work machine responsive to causing the limitation on the capability of the work implement.

14. A method, comprising:

obtaining, by a controller and from a plurality of biometric sensors of a joystick of a work machine, sensor data collected from a particular hand of an operator using the joystick, wherein the plurality of biometric sensors include a first biometric sensor positioned to be contacted by a first finger of the operator and a second biometric sensor positioned to be contacted by a second finger of the operator;

determining, by the controller and based on the sensor data, at least one of a physiological profile of the operator or an amount of time that the operator releases the joystick; and causing, by the controller and based on the at least one of the physiological profile of the operator or the amount of time that the operator releases the joystick, a limitation on a capability of a work implement of the work machine.

15. The method of claim 14, wherein causing the limitation on the capability of the work implement comprises:

causing the capability of the work implement to be gradually limited as the physiological profile of the operator changes.

16. The method of claim 14, wherein the physiological profile of the operator and the amount of time that the operator releases the joystick are determined, and wherein the limitation on the capability of the work implement is caused based on the physiological profile of the operator and the amount of time that the operator releases the joystick.

17. The control system of claim 8, wherein the plurality of biometric sensors comprise one or more of a pulse sensor, a blood oxygen sensor, or a blood alcohol sensor.

18. The method of claim 14, wherein the plurality of biometric sensors comprise one or more of a pulse sensor, a blood oxygen sensor, or a blood alcohol sensor.

19. The work machine of claim 1, wherein the plurality of biometric sensors are embedded within the joystick.

20. The work machine of claim 1, wherein the plurality of biometric sensors are attached to a surface of the joystick.

* * * * *